United States Patent [19]

Hamlin

[11] Patent Number: 5,112,477
[45] Date of Patent: May 12, 1992

[54] PURIFIED WATER AND ICE DISPENSING APPARATUS

[76] Inventor: Jerry J. Hamlin, 502 West 3rd Ave., No. 3, Mesa, Ariz. 85210

[21] Appl. No.: 662,718

[22] Filed: Mar. 1, 1991

[51] Int. Cl.⁵ .......................................... B01D 35/00
[52] U.S. Cl. ...................................... 210/85; 210/102; 210/105; 210/134; 210/195.1; 210/195.2; 210/202; 210/257.1; 210/433.1; 222/146.6; 222/189
[58] Field of Search ................. 210/652, 257.2, 102, 210/85, 136, 110, 195.2, 105, 134, 195.1, 202; 222/108, 109, 146.6, 189, 257.1; 62/347, 138, 322, 185

[56] References Cited

U.S. PATENT DOCUMENTS

| | | | |
|---|---|---|---|
| 3,151,668 | 10/1964 | Zimmermann | 222/146.6 |
| 3,807,193 | 4/1974 | McKenney et al. | 62/322 |
| 3,856,676 | 12/1974 | Grimme, Jr. et al. | 210/257.2 |
| 4,139,126 | 2/1979 | Krasner et al. | 222/146.2 |
| 4,176,063 | 11/1979 | Tyler | 210/257.2 |
| 4,623,467 | 11/1986 | Hamlin | 210/652 |
| 4,761,295 | 8/1988 | Casey | 210/652 |
| 4,770,770 | 9/1988 | Regunathan et al. | 210/102 |
| 4,801,375 | 1/1989 | Padilla | 210/257.2 |
| 4,851,818 | 7/1989 | Brown et al. | 210/85 |
| 4,885,085 | 12/1989 | Beall, Jr. | 210/257.2 |
| 4,909,934 | 3/1990 | Brown et al. | 210/110 |
| 4,969,991 | 11/1990 | Valadez | 210/257.2 |

FOREIGN PATENT DOCUMENTS 2607737 2/1976 Fed. Rep. of Germany ... 210/257.2

*Primary Examiner*—Robert A. Dawson
*Assistant Examiner*—Ana Fortuna
*Attorney, Agent, or Firm*—Antonio R. Durando; Harry M. Weiss

[57] ABSTRACT

A vending machine that dispenses either purified ice or purified water in predetermined quantities in response to a fixed payment by a user. The machine consists of compartmentalized sections for each specific function, comprising a water purification and storage portion, an ice making portion, an ice storage portion, and a product dispensing and control portion. Water from an outside source is processed to eliminate particulate and chemical impurities and it is stored for ready availability to purchasers. At the same time, a portion of the purified water is converted to ice and similarly stored in a separate compartment. Just prior to dispensation to a purchaser, the water is further treated by ultraviolet radiation to eliminate micro-organisms. As the supplies of either water or ice are depleted, the machine automatically replenishes them by processing more feed water.

9 Claims, 3 Drawing Sheets

PURIFIED WATER AND ICE DISPENSING APPARATUS

BACKGROUND OF THE INVENTION

1. Field of the Invention

This invention pertains to the general field of vending machines for articles of consumption in public places. In particular, it provides a new and improved apparatus for dispensing purified ice and water.

2. Description of the Prior Art

Vending machines have been part of the American scene for a long time and have been used to dispense all kinds of articles to the public. They can normally be found in self-service snack-bars for the sale of sandwiches, candy bars and other packaged foods; and for soft and other drinks, such as coffee, tea and chocolate, provided in cans or in disposable containers. These dispensers are also used in airports, train stations and bus depots for articles of personal hygiene and necessity. Similarly, ice making and dispensing machines are often found in hotels and motels for the convenience of guests. This invention deals with an apparatus developed to purify water for use in making ice in a standard ice machine and for dispensing both purified water and purified ice to the public in response to the deposit of a predetermined payment in the form of a coin or token.

Ice vending machines typically consist of an ice maker, a compartment where the ice is stored for systematic retrieval upon sale, a coin acceptor for payment, and a mechanism for automatically dispensing the ice into a receiving compartment upon activation by a user. Ice machines are connected to a water source, typically a utility line, so that ice can be made currently to replenish the quantities dispensed from the storage compartment as a predetermined amount is released upon the occurrence of each payment.

The prior art also includes water vending machines, similar in purpose and operation to the coffee, tea and chocolate dispensers mentioned above. One particular machine, disclosed in U.S. Pat. No. 4,623,467 (1986) by the inventor of this application, describes an apparatus for the purification of tap water prior to dispensation. The system involves multiple steps, wherein a first stage consists of a series of filters for removing particulates larger than a predetermined size, chlorine, and various organic compounds. A second stage consists of a reverse osmosis apparatus to remove substantially all the remaining particulate contaminants. The water so purified is temporarily stored in the machine and, as it is being dispensed to a purchaser, it is finally treated in a third stage consisting of an ultraviolet lamp for the treatment of micro-organisms.

One problem with this water vending apparatus is that, inasmuch as drinking water is normally served with ice cubes made from tap water, it does not completely eliminate exposure to water contaminants. Therefore, there is a need for an ice machine that utilizes purified water in the ice making process. In addition, no vending machine disclosed in prior art dispenses both water and ice. The present invention is directed at fulfilling all of these functions in the same vending machine by providing an apparatus for the purification of tap water, the making of ice using processed water, and the alternative dispensation of either according to the request of a purchaser.

BRIEF SUMMARY OF THE INVENTION

Accordingly, one objective of this invention is the development of a vending machine that incorporates the water processing and ice making characteristics of the prior art in a single piece of equipment, so that purified water is used to manufacture ice for public consumption.

Another goal of the invention is a control system that permits a user of the machine to select the alternative purchase of either ice or purified water in predetermined quantities in exchange for a fixed payment.

A further goal of the invention is a machine that is self contained and capable of providing all of the required functions for a long time without the necessity of connection to any other apparatus, other than to a source of water.

Yet another objective of the invention is a machine that can operate continuously and for long periods of time without scheduled maintenance in order to fulfill the requirements of isolated and possibly remote vending locations.

Finally, a further goal of the invention is the realization of the above mentioned goals in an economical and commercially viable manner, which is achieved by utilizing components that are either already available in the open market or that can be produced at competitive prices.

To the accomplishment of these objectives, this invention consists of a vending machine capable of dispensing either purified ice or purified water in predetermined quantities in response to a fixed payment by a user. The machine consists of compartmentalized sections for each specific function, comprising a water purification and storage portion, an ice making portion, an ice storage portion, and a product dispensing and control portion.

Water from an outside source is processed to eliminate particulate and chemical impurities and it is stored for ready availability to purchasers. At the same time, a portion of the purified water is converted to ice and similarly stored in a separate compartment. Just prior to dispensation to a purchaser, the water is further treated by ultraviolet radiation to eliminate micro-organisms. As the supplies of either water or ice are depleted, the machine automatically replenishes them by processing more feed water.

Various other purposes and advantages of this invention will become clear from its description in the specifications that follow, and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DETAILED DESCRIPTION OF THE INVENTION

The heart of this invention lies in the idea of making ice from purified water and of providing purified ice in conjunction with purified water in a single vending machine. This concept is reduced to practice in a novel combination of existing equipment and components to perform the desired functions with self-contained and reliable apparatus.

Figure 1:
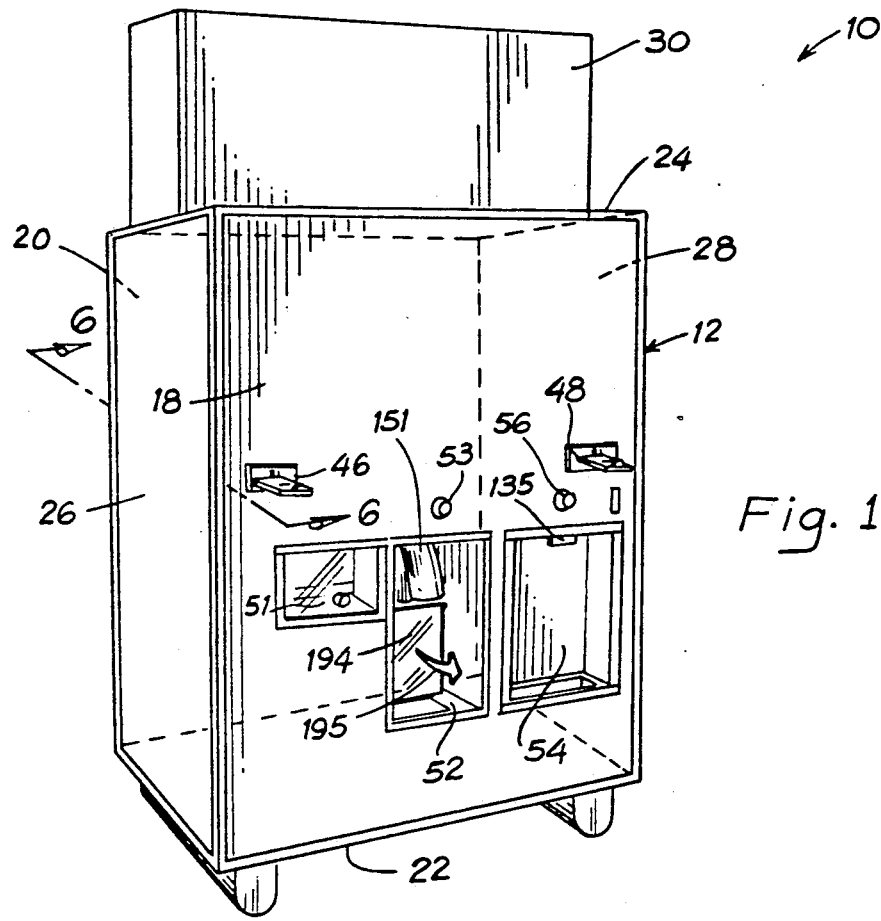
FIG. 1 is a perspective view of a purified water and ice vending machine according to the present invention.
Figure 2:
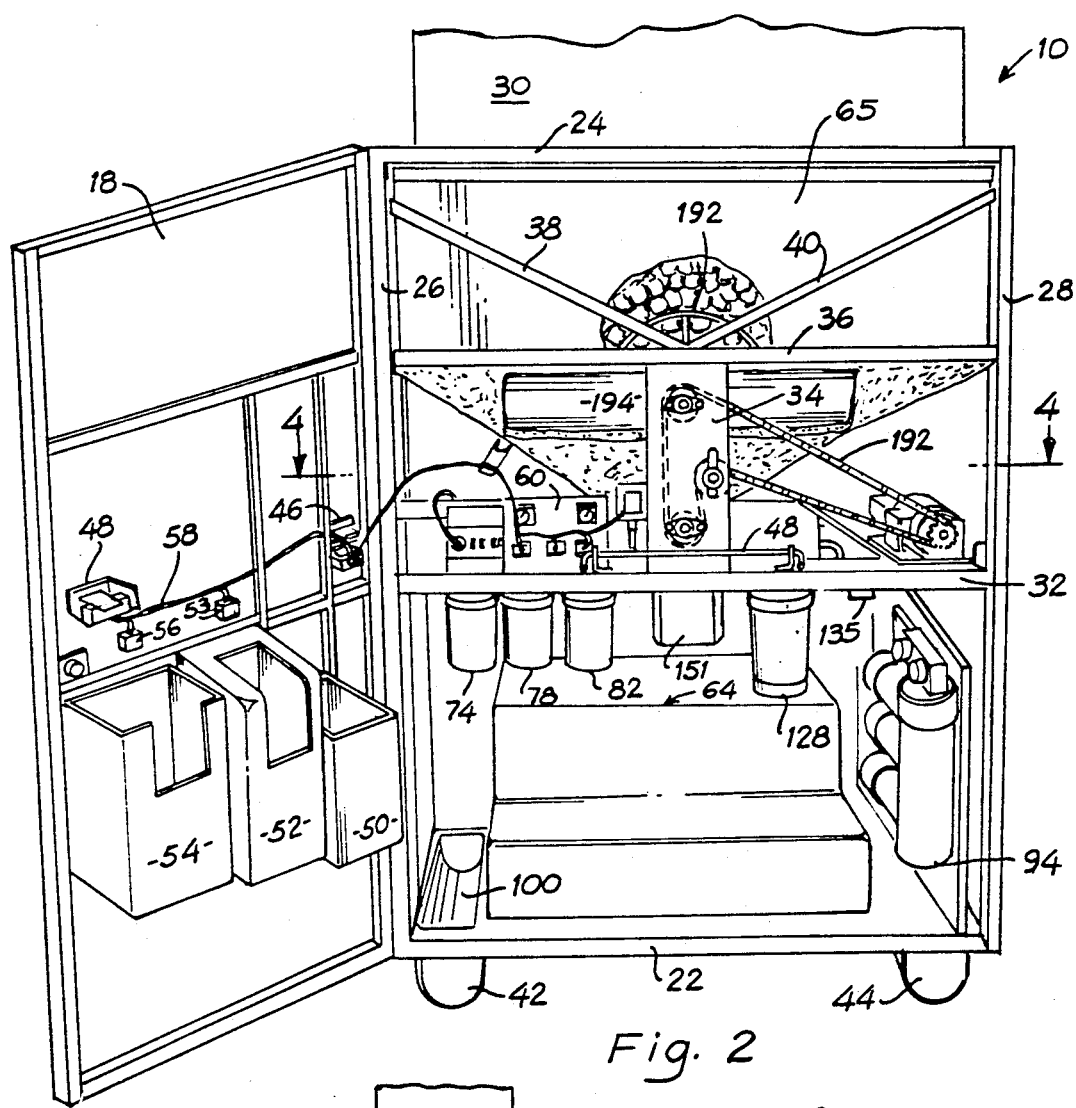
FIG. 2 is a perspective view of the purified water and ice vending machine of FIG. 1 with the hinged front panel open.

Referring to FIGS. 1 and 2, the preferred embodiment of the purified water and ice vending machine 1 of this invention is illustrated. The machine comprises a box-shaped housing or cabinet 12 that includes a hinged front door or panel 18. The housing 12 consists of a rear wall 20, a bottom panel 22, a top panel 24, a left wall 26, and a right wall 28. Directly above the top panel 24, the machine comprises an additional enclosure 30 that is fixedly connected to the housing 12.

As shown in FIG. 2, the left and right walls 26 and 28 support a shelf 32, which has a vertical plate 34 extending upwardly from the center of its front edge. The plate 34 is further connected for structural support to a horizontal brace 36 and to two diagonal braces 38 and 40 attached to the left and right walls. The bottom panel 22 has a hollow left support 42 and a similar right support 44. The rear wall 20 is fixedly connected at its perimeter to the bottom panel 22, the top panel 24, the left wall 26, and the right wall 28. Similarly, the left and right walls 26 and 28 are fixedly connected at the tops thereof to the top panel 24 and at the bottoms thereof to the bottom panel 22. The front panel 18 is hinged to the left wall 26.

Figure 5:
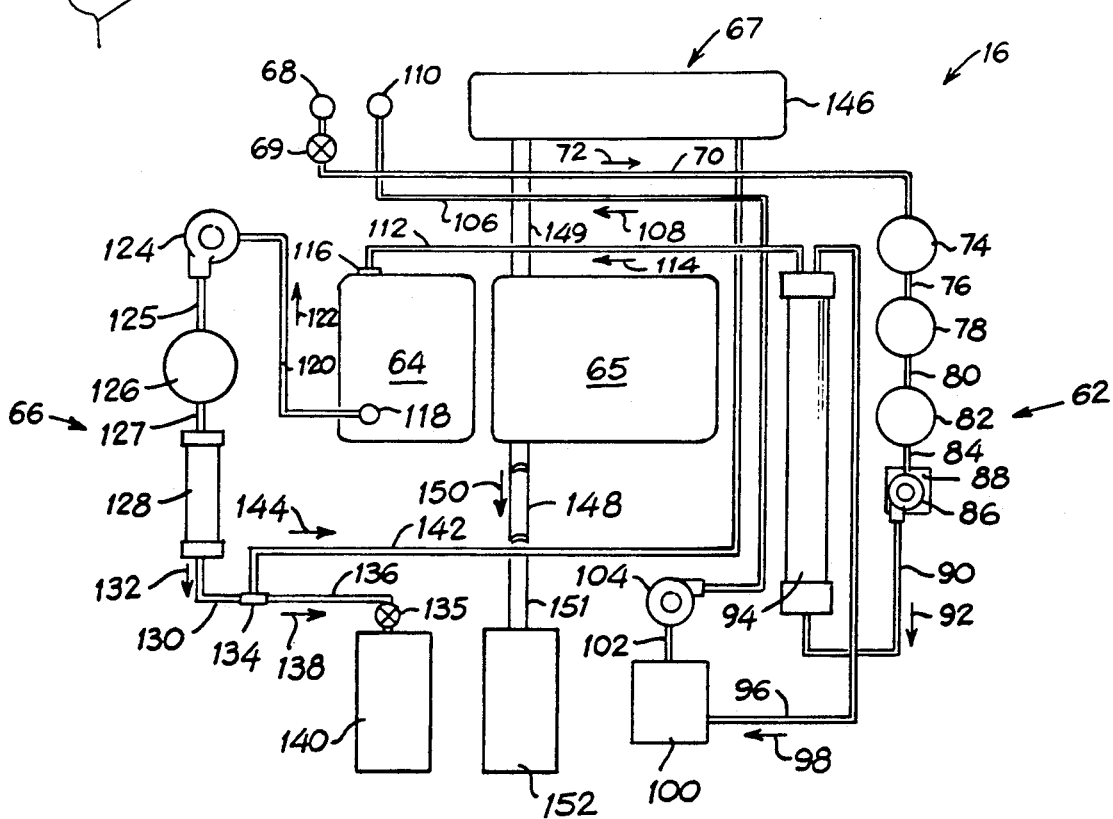
FIG. 5 is a schematic view of the purified water and ice supply system of the machine of FIG. 1.

As illustrated in schematic form in FIG. 5, the supply system 16 of this invention comprises a water pre-storage treatment portion 62 and a water storage tank 64. As seen in FIG. 2, in this embodiment of the invention this is a forty gallon plastic tank supported by the bottom panel 22. The system 16 also includes a water post-storage treatment portion 66, an ice making portion 67, and an ice storage portion 65.

The water pre-storage treatment portion 62 has an exterior water supply line 68 for connection with an exterior water source through a manual valve 69. As also illustrated in part in FIG. 2, the supply line is sequentially connected through a tube or pipe 70 for flow in the direction indicated by arrow 72 to a five micron filter unit 74 and, through a pipe 76, to a medium filter unit 78. Unit 78 is in turn connected through a pipe 80 to a five micron carbon filter unit 82. The filter of unit 74 can be any commercially available filter capable of stopping substantially all solid particles larger than five microns in diameter, such as the polypropylene filter used in the water purification system disclosed in U.S. Pat. No. 4,623,467. The filter of unit 78 consists of a copper-zinc alloy marketed under the trademark "KDF55D" by KDF Fluid Treatment Company of Constantine, Mich. This alloy is used to eliminate inorganic contaminants, especially heavy metals such as lead and mercury, chlorine and hydrogen sulfide. The filter of unit 82 is a standard 5-micron carbon-absorption filter and it is used to entrap various organic compounds and the remaining chlorine that would be harmful to the membrane of the reverse osmosis apparatus.

Still referring to the diagram of FIG. 5, a pipe 84 connects unit 82 to a pump 86, which is driven by a motor 88. The pump 86 is further connected through a pipe 90 for flow in the direction indicated by arrow 92 to a reverse osmosis membrane unit 94. As well described in prior art, the reverse osmosis unit is utilized for removing substantially all the ionic and high molecular weight organic contaminants from the water stream. The unit 94 has a purified water outlet connected to pipe 112 for flow in the direction indicated by arrow 114 to the water storage tank 64. A waste water pipe 96 is also provided for flow in the direction 98 from unit 94 to a five gallon waste water tank 100. A pipe 102 connects tank 100 to a second pump 104 for flow, through pipe 106, in the direction indicated by arrow 108 to an exterior waste water line 110.

The storage tank 64 has an inlet 116 connected to pipe 112 and has an outlet 118 feeding a pipe 120, which is the beginning of the water post-storage treatment portion 66. The outlet 118 is connected for flow in the direction indicated by arrow 122 to a third pump 124, which in turn is coupled through a pipe 125 to a five micron carbon block filter 126. A pipe 127 connects the outlet of this filter to an ultraviolet light unit 128, which is further connected through a pipe 130 for flow in the direction of arrow 132 to a T-shaped pipe connection or fitting 134. One of the outlets of fitting 134 is connected to a first dispenser pipe 136 for flow, through a normally-closed valve 135, in the direction of arrow 138 to an open-top container 140 of a customer.

The ice making portion 67 is connected to the second outlet of the T-shaped fitting 134 for flow in the direction indicated by arrow 144 to an ice making machine 146. While not specifically shown in any of the figures, the ice making machine 146 can be any standard ice maker commercially available and capable of fitting in the space provided by the enclosure 30. Such apparatus receives water through a normally-closed control valve that is opened only when water is required as a result of ice discharge from the machine. As adapted for use in the apparatus of this invention, the ice making machine 146 is connected to its water source through pipe 142 and to an ice storage bin 65 through an ice conduit 149. Finally, a dispensing conduit 148 connects the storage bin to a second dispenser pipe 151 for passage and dispensing of ice pieces in the direction of arrow 150 to an open-top bag or container 152 of a customer.

As illustrated in FIGS. 1 and 2, the various functional components shown in schematic form in FIG. 5 are distributed throughout the interior of the vending machine 10 for optimal utilization of the available space. The reverse osmosis membrane unit 94, which is available in modular form, is inserted as a separate unit into a receiving bracket on the right wall 28 for connection to the apparatus. The functioning of the components is controlled by conventional electrical and electronic circuitry to produce the desired responses to the actions of customers. This part of the invention includes a left coin acceptor 46 and a corresponding actuating push-button switch 53 for the purchase of ice. Similarly, a right coin acceptor 48 and actuating push-button switch 56 are provided for the purchase of purified water. Both systems are electrically connected to a control panel 60 by a system of wires 58 in a way that would be obvious to those skilled in the art. The control panel 60 includes two separate timers for measuring the time allowed for dispensing water and ice during each cycle of operation. When a user introduces the required payment in one of the coin acceptors and actuates the corresponding push-button switch, power is delivered to the corresponding dispensing system and its timer begins counting. If purified water is being purchased, the normally-closed relay valve 135 is opened by an electrical signal from the control panel 60 and kept open for a predetermined period of time measured by the timer. At the same time, the pump 124 is actuated to supply water from the storage tank 64 to a container placed by the user in the water dispenser unit 54.

When the predetermined period of time expires, as measured by the timer, the pump and valve are shut off and the delivery of water stops. If demand causes the water level in the storage tank to fall below a certain level, as measured by a standard level controller (not shown in the figures), the motor 88 is actuated to run the pump 86 to re-fill the tank with water drawn from the exterior water supply line 68 and processed through the pre-storage treatment portion 62 of the invention. The same level controller is set to shut off the motor 88 and interrupt the pre-storage water processing function when the water level in the storage tank 64 is completely re-established.

Figure 3:
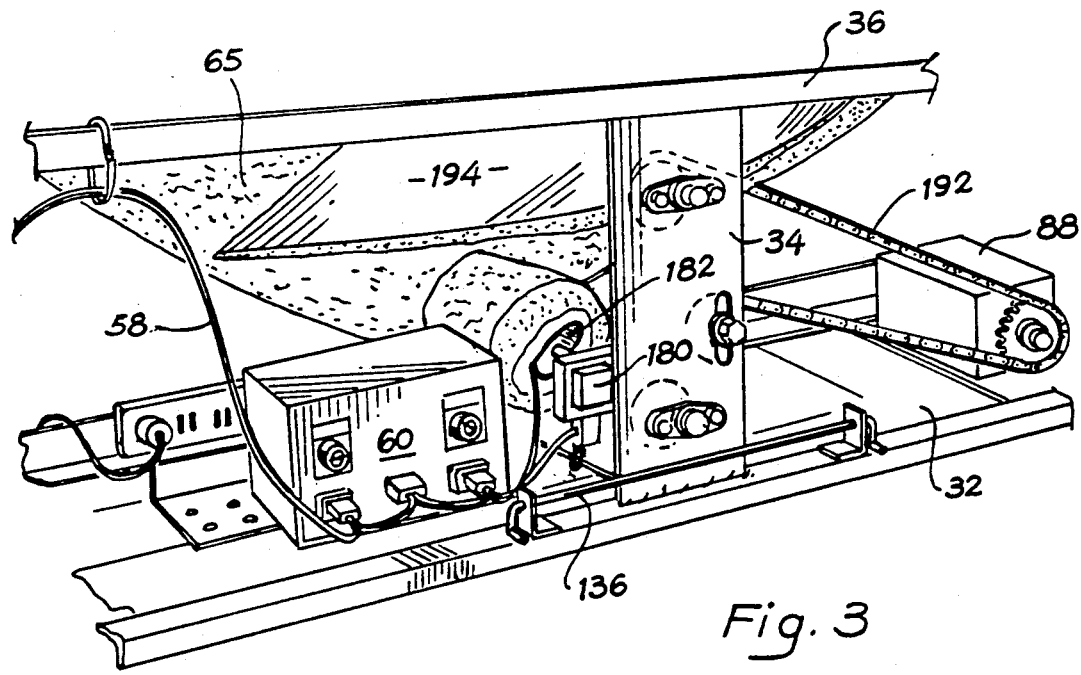
FIG. 3 is a perspective view of the mid-section of the machine of FIG. 2, showing the control system and the driving mechanism for the dispensation of purified water and ice.
Figure 6:
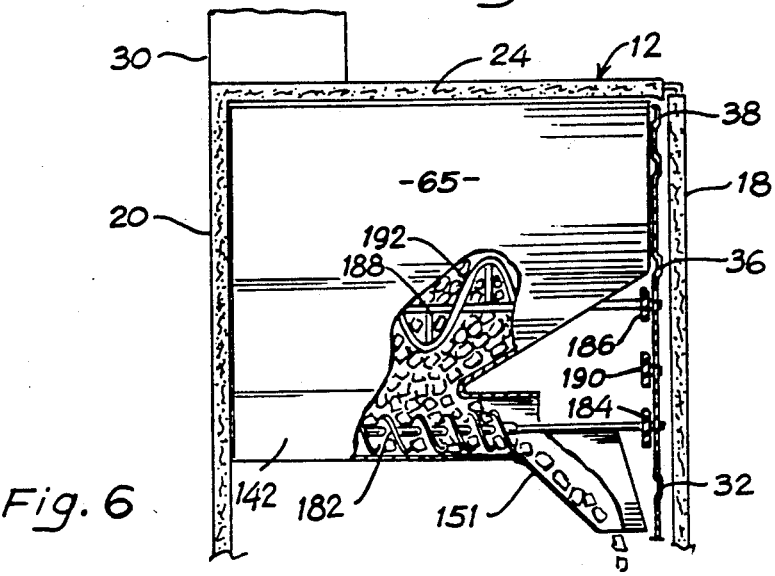
FIG. 6 is a sectional view taken along line 6—6 in FIG. 1.
Figure 4:
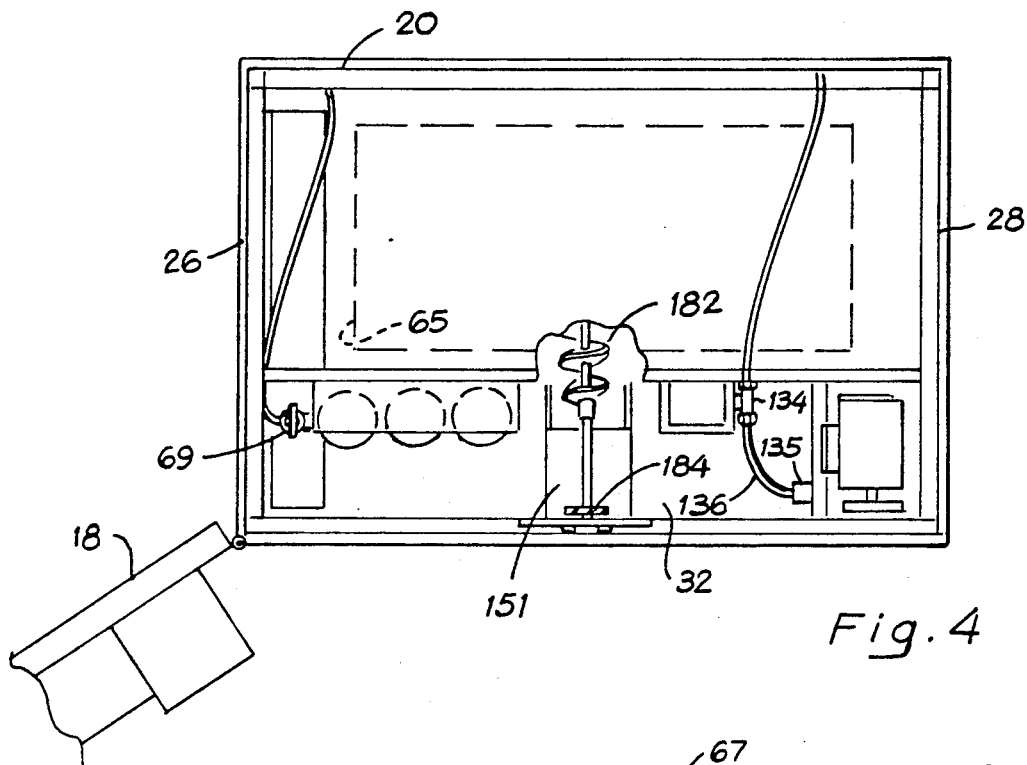
FIG. 4 is a sectional view taken along the line 4—4 of FIG. 2.

Alternatively, when a user introduces the required payment into coin acceptor 46 and actuates the push-button switch 53 for the purchase of ice, another timer in the control panel 60 is started to control the ice delivery function. As mentioned above, the ice making machine 146 manufactures ice pieces from purified water and stores them in an ice bin 65. As illustrated in FIGS. 2, 3 and 6, this bin is located directly under the ice maker in the top portion of the housing 12 and consists of a container with a sloped bottom converging to a trough or dispensing conduit 148 for the collection of ice around a screw conveyor 182 placed along its length. The conveyor 182 is supported by bearings mounted at each end of its axle on the back side of the bin and on the vertical plate 34, and it is driven by a sprocket 184 which, in turn, is driven by a chain 192 (seen in FIG. 3). The same chain also drives a second sprocket 186 that is similarly mounted on an ice stirring shaft 188 located above the screw conveyor 182 in the sloped section of the bin 65. The stirring shaft features a spiral frame 192 that stirs the ice around as the shaft rotates and prevent it from forming solid accumulations of ice that might otherwise prevent the conveyor 182 from picking up and transporting ice pieces to the dispenser pipe 151, which consists of a gravity chute. A third sprocket 190 is also mounted on the vertical plate 34 and it is used as a slidable idler to adjust the tension of the chain 192. An electrical motor 88 is provided to drive the chain and, consequently, to cause the screw conveyor and stirring shaft to operate.

The exterior of bin 65 is covered with insulation to minimize heat losses and ice melting, except for a portion 194 in the sloped frontal side of the bin. It has been found that noninsulated exposure to ambient conditions on that side of the bin facilitates the elimination of water resulting from ice melting in the bin. Note that some degree of ice liquefaction is unavoidable because the bin is not refrigerated.

Thus, when the ice dispensing system is activated by the control board 60, the motor 88 is turned on for a predetermined period of time, causing the screw conveyor 182 to deliver ice through the conduit 148 and the dispenser pipe or chute 151 to a receiving ice bag or container-provided by a customer in the ice-dispenser unit 52, which is incorporated in the front panel 18 of the machine. During the period of ice delivery, the stirring shaft 188 becomes operational as well and the ice is stirred in the bin 65 to retain its shape characteristics. As ice is drawn from the bin, new ice is manufactured by the ice maker 146 housed in the enclosure 30 and it is dropped in the bin pursuant to control signals emitted by a bin level controller (not shown in the figures) according to conventional means well known in the art. Similarly, as the ice maker requires batches of purified water to produce ice, water is pumped to it by the actuation of pump 124.

This embodiment of the invention also features an ice bag storage and dispenser unit 50 incorporated into the inner side of the front panel 18. A door 51, slideably mounted on the outer side of the front panel, normally prevents access to the dispenser unit 50. A latch lever 136 (shown in FIG. 3), mounted on the front edge of the shelf 32, normally engages the top of the door 51 when the front panel 18 is closed and prevents it from sliding open. When the ice dispensing system is actuated by payment of the required purchase price, the control board 60 energizes a solenoid 180 that causes the lever 136 to rotate and disengage the door 51, thus permitting it to be opened to retrieve an ice bag from the dispenser 50.

The condensation resulting from the operation of the ice maker 146, the water drained from the bin 65 from the melting of ice, and the waste water produced by the reverse osmosis membrane unit 94 are all collected in a single waste water tank 100. In the particular embodiment of the invention illustrated in the figures, this tank is located in the left support 42 for optimal space utilization and consists of a five gallon container equipped with a level controller and pump (only shown in the schematic of FIG. 5) for periodic disposal to an exterior drain 110.

While any conventional means of construction is acceptable for the manufacture of the housing 12 of this vending machine, it is found that reinforced-fiberglass unibody construction is preferable because of its structural strength, light weight and relatively low cost. Many obvious particulars of the vending machine are not described here because they do not represent inventive subject matter, but rather simple solutions to well understood accessory requirements of the invention. For example, the apparatus must be wired for connection with a power source, sturdy hinges are required to support the front panel, and a lock may be provided to secure its closure.

In the preferred embodiment of the invention, the timers in the control panel 60 are set to deliver 5 pounds of purified ice and one gallon of purified water during each respective cycle. While the apparatus is described as responding to predetermined payments in coin or token, it could be modified in obvious ways to function for free in response to manually operated switches. In addition, a simple modification to the ice dispenser unit 52 could be implemented for loading ice into containers that are too large to fit directly under the chute 151. As shown in FIG. 1, a flap 194, located under the chute and hinged along its upper edge, would permit a user to divert the flow of ice from the chute to a container outside the unit 52 by rotating it in the direction indicated by arrow 195.

Various changes in the details, steps and materials that have been described may be made by those skilled in the art within the principles and scope of the invention herein illustrated and defined in the appended claims. Therefore, while the present invention has been shown and described herein in what is believed to be the most practical and preferred embodiment, it is recognized that departures can be made therefrom within the scope of the invention, which is therefore not to be limited to the details disclosed herein but is to be accorded the full scope of the claims so as to embrace any and all equivalent apparatus and methods.

The embodiments of an invention in which an exclusive property or right is claimed are defined as follows:

1. A vending machine for the alternative dispensing of purified water and purified ice, comprising:
   (a) a housing;
   (b) a pre-storage water treatment system;
   (c) a purified water storage system;
   (d) a post-storage water treatment system;
   (e) a purified ice making system;
   (f) a purified ice storage system;
   (g) a purified water dispensing system;
   (h) a purified ice dispensing system; and
   (i) means for controlling the functioning of all said systems;
   wherein said pre-storage water treatment system is a series connected assembly comprising:
   a water supply inlet pipe;
   a five micron filter unit;
   a medium filter unit;
   a five micron carbon filter unit;
   a pump; and
   a reverse osmosis membrane unit; and wherein said medium filter unit consists of a copper-zinc alloy.

2. The vending machine of claim 1, wherein said post-storage water treatment system is a series connected assembly comprising:
   an inlet pipe connected to said purified water storage system;
   a pump;
   a five micron carbon block filter unit;
   an ultraviolet light unit; and
   a t-shaped connection having a first outlet pipe connected to said purified water dispensing system and having a second outlet pipe connected to said purified ice making system.

3. The vending machine of claim 1, wherein said purified ice storage system consists of an insulated bin having an ice stirring shaft to prevent the formation of ice accumulations and having a conveyor for delivering ice to said purified ice dispensing system.

4. The vending machine of claim 1, wherein said purified ice storage system consists of an insulated bin having an ice stirring shaft to prevent the formation of ice accumulations and having a conveyor for delivering ice to said purified ice dispensing system; and wherein the frontal side of said insulated bin is directly exposed to ambient conditions in order to facilitate the elimination of water resulting from ice melting in the bin.

5. The vending machine of claim 1, wherein said reverse osmosis membrane unit includes a series connected sub-assembly comprising:
   a waste water outlet pipe attached to said reverse osmosis membrane unit;
   a waste water tank having an outlet pipe;
   a pump having an outlet pipe; and
   an exterior waste water line.

6. The vending machine of claim 1, wherein said purified water dispensing system comprises a normally-closed valve connected to said post-storage water treatment system and actuated by said means for controlling the functioning of all said systems, and comprising a purified water dispenser unit for receiving a container provided by a user.

7. The vending machine of claim 1, wherein said purified ice dispensing system comprises a chute connected to said purified ice storage system and a purified ice dispenser unit for receiving a container provided by a user.

8. The vending machine of claim 7, further comprising an ice bag storage and dispenser unit, wherein a normally-latched slidable door prevents unauthorized access to empty ice bags storage therein and wherein said door is unlatched during operation of the ice dispensing cycle, so that a user is able to reach through said door and retrieve a bag for ice collection.

9. A vending machine for the alternative dispensing of purified water and purified ice, comprising:
   (a) a housing, consisting of a bottom cabinet with a hinged front door and a top enclosure;
   (b) a pre-storage water treatment system consisting of a series connected assembly comprising:
      a water supply inlet pipe;
      a five micron filter unit;
      a medium copper-zinc alloy filter unit;
      a five micron carbon filter unit;
      a pump; and
      a reverse osmosis membrane unit, including a series connected sub-assembly comprising a waste water outlet pipe, a waste water tank having an outlet pipe, a pump having an outlet pipe, and an exterior waste water line;
   (c) a purified water storage system consisting of a storage tank having an inlet pipe connected to said pre-storage water treatment system and having an outlet pipe;
   (d) a post-storage water treatment system consisting of a series connected assembly comprising:
      an inlet pipe connected to said outlet pipe of said purified water storage system;
      a pump;
      a five micron carbon block filter unit;
      an ultraviolet light unit; and
      a T-shaped connection having a first outlet pipe and a second outlet pipe;
   (e) a purified ice making system consisting of an ice making machine having an inlet pipe connected to said second outlet pipe of said T-shaped connection in said post-storage water treatment system and having an outlet pipe;
   (f) a purified ice storage system consisting of an insulated bin connected to said outlet pipe of said purified ice making system, having an ice stirring shaft to prevent the formation of ice accumulations, having a conveyor for delivering ice, and wherein the frontal side of said insulated bin is directly exposed to ambient conditions in order to facilitate the elimination of water resulting from ice melting in the bin;
   (g) a purified water dispensing system comprising a normally-closed valve connected to said first outlet pipe of said T-shaped connection in said post-storage water treatment system, and further comprising a purified water dispenser unit for receiving a container provided by a user;

(h) a purified ice dispensing system comprising a chute connected to said conveyor for delivering ice in said purified ice storage system, a purified ice dispenser unit for receiving a container provided by a user, and further comprising an ice bag storage and dispenser unit, wherein a normally-latched slidable door prevents unauthorized access to the bags and wherein said door is unlatched during operation of the ice dispensing cycle; and (i) means for controlling the functioning of all said systems, comprising two sets of one manually operated coin acceptor, one push-button switch, one timer, and logic circuitry for each of the purified water and purified ice dispensing cycles.

* * * * *